Nov. 23, 1965    R. P. DUMM    3,219,055
RETRACTABLE SPACER RING FOR VALVE SEATS
Filed May 14, 1962
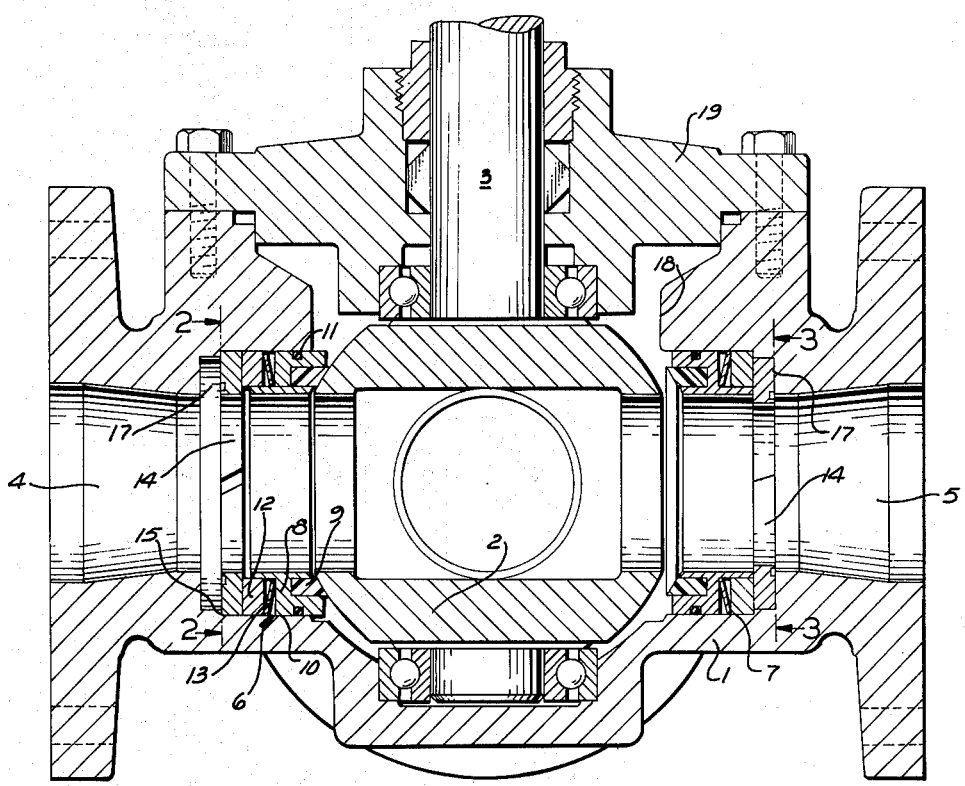
FIG. 1
FIG. 2
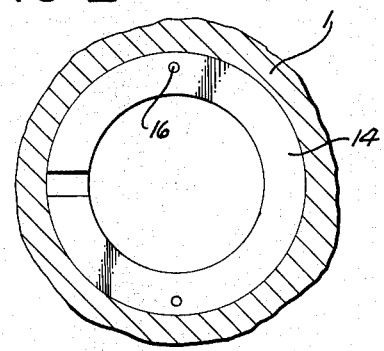
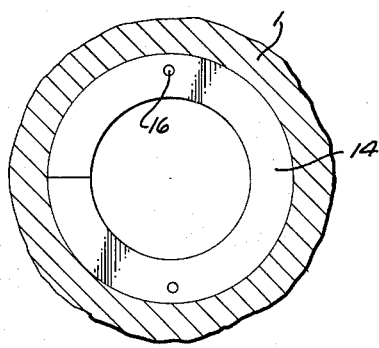
FIG. 3
INVENTOR.
ROBERT P. DUMM
BY 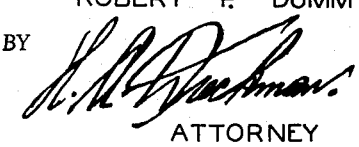
ATTORNEY

3,219,055
RETRACTABLE SPACER RING FOR VALVE SEATS
Robert P. Dumm, Long Beach, Calif., assignor to Pacific Valves, Inc., Long Beach, Calif., a corporation of California
Filed May 14, 1962, Ser. No. 194,419
2 Claims. (Cl. 137—315)

This invention relates to a retractable ring for valve seats whereby a valve seat may be moved away from the surface of the rotating ball, and retained in this retracted position while the ball is being removed from or replaced in the valve housing.

My invention is directed particularly to ball or globe type valves where the ball or globe can be removed from the body of the valve through an appropriate opening in the top of the valve body. This is a so-called top entry valve.

An object of my invention is to provide a novel retractable spacer ring which, when moved into an appropriate recess in the body of the valve, will permit the seal assembly to be retracted and spaced from the ball or globe of the valve, so that this ball or globe can be readily removed from the body for the purposes of replacement or repair.

Another object is to provide a novel retractable spacer ring which is simple in construction and which can be readily moved into a recess in the body of the valve and thus permit retraction of the valve seal and valve seal ring, together with the spring assembly therein, so that the valve seal will be substantially spaced from the outer surface of the ball or globe.

Other objects, advantages and features of my invention may appear from the accompanying drawing, the subjoined detailed description and the appended claims.

In the drawing:

FIGURE 1 is a vertical sectional view of a ball or globe type valve embodying my invention.

FIGURE 2 is a fragmentary sectional view taken on line 2—2 of FIGURE 1.

FIGURE 3 is a fragmentary sectional view taken on line 3—3 of FIGURE 1.

Referring more particularly to the drawing, the numeral 1 indicates the body of a valve in which a ball 2 is rotatably mounted. The ball 2 is rotated by means of a stem 3 in the usual and well known manner of this type of valve. The body 1 of the valve is provided with the usual intake 4 and an outlet 5 between which the ball 2 is mounted as shown; this ball being rotatable about its vertical axis to various positions. The valve may have more than a single outlet 5 if desired, since this also is a usual and well known structure in this type of valve.

To seal the ball 2 on the upstream and/or the downstream side, I provide pressurized seals 6 and 7 which are substantially identical in construction, and each seal consists of a seal ring 8, in one end of which an appropriate nonmetallic seal 9 is mounted. The seal or seal ring 9 is shaped to conform with the exterior surface of the ball 2, and in one position of the parts will engage the outer surface of this ball. This position is shown on the left-hand side of FIGURE 1. The seal ring 8 is slidably mounted in an annular cylindrical passageway 10 in the body 1 of the valve. An external packing ring 11 is provided in the seal ring 8 to prevent leakage around the outer periphery of the seal ring. A metal annulus 12 is fitted into the back of the seal ring 8, and a spring of the Belleville type 13 is positioned between the annulus 12 and the seal ring 8, for the purpose of pressing the nonmetallic seal 9 against the ball. A split metal spring ring 14 fits within the cylindrical passageway 10 and bears against one edge of the annulus 12 to hold the parts in one position, as shown on the left-hand side of FIGURE 1, that is, to hold the sealing ring 9 against the ball 2. In this position of the parts the split ring 14 rests against a shoulder 15 at one end of the cylindrical passageway 10.

When it is desired to retract the pressurized seal assembly 6 from the ball 2, the split ring 14 is compressed by inserting an appropriate tool in the holes 16. The spring ring is then compressed enough to clear the shoulder 15 and permit the split ring to move into the adjacent annular space 17, where it will remain because of the outward spring in the ring 14. Sufficient space is now provided to permit the entire seal assembly 6 to be moved outwardly, so that the seal rings 9 will escape the outer surface of the ball 2 and permit the ball to be lifted through the aperture 18 in the upper portion of the body 1 of the valve. The aperture 18 is closed by a cap 19 which bolts onto the top of the body 1 and encloses and seals the aperture 18. The stem 3 of the ball 2 is suitably journaled and packed in the cap 19, all of which is usual and well known in the art. The Belleville spring 13 has a very limited expansion and, consequently, will not push the parts 8 and 9 inwardly towards the ball 2 when the split ring 14 has been moved into the space 17 as described. The Belleville spring has a limited expansive movement and only operates to press the packing 9 against the ball 2 when the parts are in a position to pack-off the ball, namely, the position shown on the left-hand side of FIGURE 1. In the position of the parts shown on the right-hand side of FIGURE 1 the packing ring 9 and the seal mount 8 will maintain their retracted position sufficient to permit the ball 2 to be removed or reinserted, as previously described.

Having described my invention, I claim:

1. In a globe type valve, including a body,
   a ball rotatably mounted in said body,
   said body having an intake and an outlet port therein, both of said ports extending to the ball, and said ball having a passage therethrough rotatable into and out of registry with said port,
   said body having an access opening therein adapted to pass said ball therethrough,
   said body having a cylindrical passageway therein positioned adjacent the intake or outlet port,
   a seal ring slidably mounted for limited movement in the cylindrical passageway relative to said ball,
   a packing in the seal ring slidably engaging the ball in one position of the seal ring,
   spring means engaging the seal ring and pressing the the ring towards the ball,
   a split ring mounted in the cylindrical passageway,
   said split ring engaging the seal ring in said one position,
   a shoulder in the cylindrical passageway engaged by the split ring in said one position,
   said valve body having an annular space therein communicating with said cylindrical passageway,
   said split ring being movable from the cylindrical passageway into the annular space, to provide sufficient space for movement of the packing out of engagement with the ball whereby the ball may be withdrawn from the body through said access opening.

2. In a globe type valve, including a body,
   a ball rotatably mounted in said body,
   said body having an intake and an outlet port therein, both of said ports extending to the ball, and said ball having a passage therethrough rotatable into and out of registry with said port, said body having an access opening therein adapted to pass said ball therethrough, said body having a cylindrical passageway therein positioned adjacent the intake or outlet port, a seal ring slidably mounted for limited movement in the cylindrical passageway relative to said ball, a nonmetallic packing in the seal ring slidably engaging the ball in one position of the seal ring, spring means engaging the seal ring and pressing the ring towards the ball, an annulus positioned at one end of the seal ring, the spring means engaging the annulus, a split ring mounted in the cylindrical passageway, one side of the split ring bearing against the annulus, and a stop shoulder in the body of the valve engaged by said split ring in said one position, said body having an annular space therein adjacent the cylindrical passageway, said split ring being movable into the annular space, to provide sufficient space for movement of the packing out of engagement with the ball whereby the ball may be withdrawn from the body through said access opening.

References Cited by the Examiner

UNITED STATES PATENTS

| | | | |
|---|---|---|---|
| 2,392,198 | 1/1946 | Snyder | 261—174 |
| 2,520,288 | 8/1950 | Shand | 251—174 |
| 2,973,182 | 2/1961 | Gill | 251—174 |
| 3,037,738 | 1/1962 | Jackson | 251—174 X |
| 3,045,693 | 7/1962 | Allen | 137—315 |
| 3,068,887 | 12/1962 | Grove | 251—174 X |
| 3,083,945 | 4/1963 | Shafer | 251—317 X |
| 3,114,386 | 12/1963 | Dumm | 251—174 X |

FOREIGN PATENTS 1,102,510   1961   Germany.

ISADOR WEIL, *Primary Examiner.*